United States Patent
Wikström

[19]

[11] Patent Number: 5,995,981
[45] Date of Patent: Nov. 30, 1999

[54] INITIALIZATION OF REPLICATED DATA OBJECTS

[75] Inventor: Claes Wikström, Skärholmen, Sweden

[73] Assignee: Telefonaktiebolaget LM Ericsson, Stockholm, Sweden

[21] Appl. No.: 08/876,587

[22] Filed: Jun. 16, 1997

[51] Int. Cl.[6] .................................................... G06F 17/30
[52] U.S. Cl. ............................... 707/202; 707/8; 707/200
[58] Field of Search .................................... 707/202, 200, 707/8

[56] References Cited

U.S. PATENT DOCUMENTS

| | | | |
|---|---|---|---|
| 5,301,309 | 4/1994 | Sagano | 395/182.1 |
| 5,440,727 | 8/1995 | Bhide et al. | 395/444 |
| 5,544,359 | 8/1996 | Tada et al. | 395/600 |
| 5,608,865 | 3/1997 | Midgely et al. | 395/180 |
| 5,687,363 | 11/1997 | Oulid-Aissa et al. | 395/604 |
| 5,737,601 | 4/1998 | Jain et al. | 395/617 |

OTHER PUBLICATIONS

Patent Abstracts of Japan, vol. 014, No. 238 (P–1050), May 21, 1990 & JP 02 059942 A (Hitachi Ltd), Feb. 28, 1990.
Skeen et al, "A Formal Model of Crash Recovery in a Distributed System", Fifth Berkeley Workshop on Distributed Data Management and Computer Networks, Berkeley, CA, USA, Feb. 3–4, 1981, vol. SE–9, No. 3, ISSN 0098–5589, IEEE Transactions on Software Engineering, May 1983, USA, pp. 219–228.

*Primary Examiner*—Paul R. Lintz
*Assistant Examiner*—Jean Bolte Fleurantin
*Attorney, Agent, or Firm*—Nixon & Vanderhye, P.C.

[57] ABSTRACT

In a replicated database environment, all nodes (30) monitor the well-being of each other by receipt of node status messages over a network (20). When a node is detected as no longer being alive, the other nodes deduce that such node has failed. When a node failure is detected, a nodestatus record having a nodedown value is written into a node log (80) with respect to the failing node. Similarly, when a node comes alive or a new node becomes known to the network, a node status record having a nodeup value is written into the node log. When a local node fails and then is restarted, the local node uses the contents of its node log in order to determine how to initialize the value of a replicated data object. By reading its node log, the local node can decide whether the data object can be initialized from its disk (32) or not.

12 Claims, 3 Drawing Sheets

INITIALIZATION OF REPLICATED DATA OBJECTS

This invention is related to that described in simultaneously-filed U.S. patent application Ser. No. 08/876,588, entitled "LINGERING LOCKS FOR REPLICATED DATA OBJECTS", which is incorporated herein by reference.

BACKGROUND

1. Field of Invention

This invention pertains to distributed or replicated databases, and particularly to initialization of data objects maintained by such databases.

2. Related Art and Other Considerations

When executing application programs, computers frequently assign and/or change values of data objects. In many instances the data objects are stored as part of a database. In more complex systems in which a plurality of computers are networked together, more than one computer may require access to a certain data object, and may change or update the value of that data object. To cater to such a multi-computer networked environment, a replicated database system can be established. In a replicated database system, each computer can maintain its own version of the database so long as all other computers are advised of the changes of a data object for maintaining consistency among the replicated databases.

Replicated databases have two primary advantages. A first advantage is fault tolerance. A second advantage is that local access to a replicated database is faster and less expensive than remote access to a database at another computer.

Despite their advantages, initialization of data objects at a replicated database can be complex. For example, assume a simple situation involving two computers N1 and N2 which are networked together. Each computer N1, N2 has its version of the database, the version of the database at computer N1 being DB1 and the version of the database at computer N2 being DB2. When both computers N1 and N2 are functioning normally, any change to a data object by one computer is communicated to the other computer over the network so that databases DB1, DB2 are kept the same. Such change and negotiation of data object updates occur commonly in the prior art, using (for example) a two-phase commit protocol as set forth in Bernstein, P. A., et al., *Concurrency Control and Recovery In Database Systems*, Addison Wesley, 1987.

Consider the situation in which computer N1 fails, but computer N2 continues to operate and to update the value of the data object in its database DB2. Then suppose that computer N2 subsequently also fails, with the result that both computers N1 and N2 are down. The contents of the data object in database DB2 is newer than the contents of the same data object in database DB1.

When computer N1 restarts, it would be erroneous for computer N1 to attempt to initialize values for the data object using its version thereof stored in database DB1, since the newer data resides at database DB2 maintained by computer N2. However, computer N1 must determine how to initialize its data objects solely on local information available to computer N1. Accordingly, computer N1 does not know that the newer value of the data object resides at database DB2 rather than database DB1. Moreover, it is not possible to investigate or negotiate the matter with computer N2, since computer N2 is presently not operational.

Initialization of distributed databases is expounded by Attar, R., et al., "Site Initialization, Recovery, and Backup In A Distributed Database System", *IEEE Transactions On Software Engineering*, Vol. 10(6) November 1983, pp. 645–650, and Skeen, D. et al., "A Formal Model Of Crash Recovery In Distributed Systems", *IEEE Transactions On Software Engineering*, May 1983, SE-9(3):219–228. Current initialization schemes commonly require cooperation and communication between computers, which (as indicated above) is not always feasible or realistic. Particularly problematic is determining, in a replicated database environment, how to initialize data objects at a first computer when no other computers of the replicated database system are operational.

In the field of telecommunications, minimizing downtime is of vital importance. Thus, quickly restarting a computer system with a replicated database is paramount.

What is needed, therefore, and an object of the present invention, are method and apparatus for initializing a data object of a replicated database using only local information.

SUMMARY

In a replicated database environment, all nodes monitor the well-being of each other by receipt of node status messages over a network. When a node is detected as no longer being alive, the other nodes deduce that such node has failed. When a node failure is detected, a nodestatus record having a nodedown value is written into a node log with respect to the failing node. Similarly, when a node comes alive or a new node becomes known to the network, a node status record having a nodeup value is written into the node log. When a local node fails and then is restarted, the local node uses the contents of its node log in order to determine how to initialize the value of a replicated data object. By reading its node log, the local node can decide whether the data object can be initialized from its disk or not.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
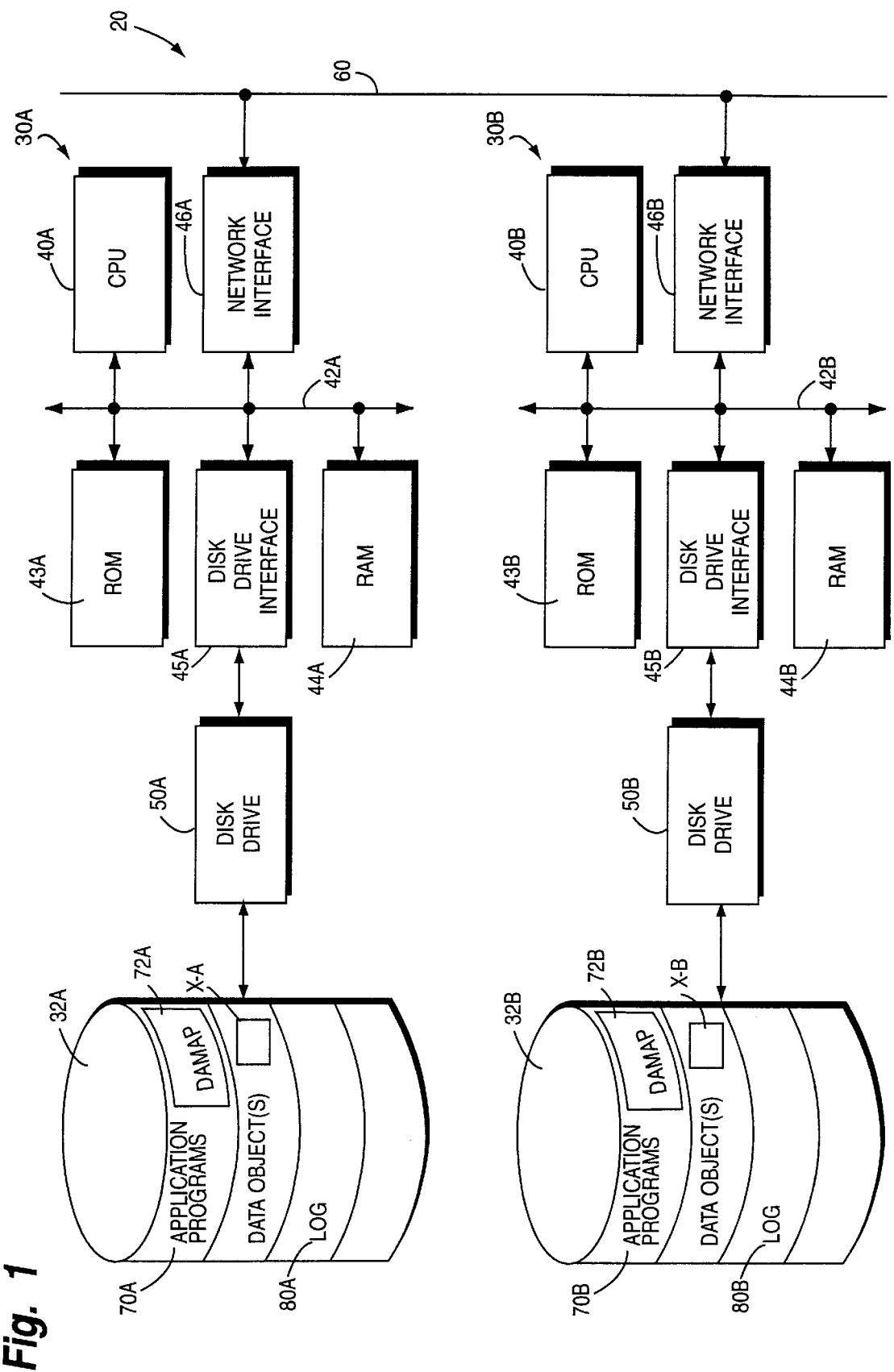
FIG. 1 is a schematic view of a network including two nodes whereat replicated data objects reside.

FIG. 1 shows a network 20 comprising two illustrative nodes 30A and 30B, also referenced separately as nodes "A" and "B" and generically as "node 30". Each node 30 has its own version of a data object X. Specifically, node 30A has hard disk 32A whereon its version of data object X, referenced as X-A, is stored. Similarly, node 30B has hard disk 32B whereon its version of data object X, referenced as X-B, is stored. As employed herein, "data object" can refer to a single data value, or to a collection or table of data values such as often occurs in a database.

Since versions of data object X are stored both at nodes 30A and 30B, when one node updates the value of data object X, the updated value is communicated to the other node so that the other node can likewise have the updated value, thereby maintaining a coordination of the value of the data object X. Such coordination can occur by an appropriate updating or negotiating technique for a replicated database, such as by the two-phase commit protocol, for example.

Each node 30 includes a processor or CPU 40 which is connected by an internal bus 42 to numerous elements. Illustrated ones of the elements connected to internal bus 42 include a read only memory (ROM) 43; a random access memory (RAM) 44; a disk drive interface 45; and, a network interface 46. Disk drive interface 45 is connected to disk drive 50. Network interface 46 is connected to network link 60 over which the nodes 30A and 30B communicate.

Hard disk 32 is one example of a node-status inviolable memory or storage medium. By "node-status inviolable" is meant that the contents of the memory remain unaffected when the node crashes or assumes a "down" status. Although the node-status inviolable memory is illustrated in one embodiment as being a hard magnetic disk, it should be understood that other types of memory, e.g., optical disk, magnetic tape, etc., are also included.

Processor 40 executes a set of instructions in an operating system, which in turn allow processor 40 to execute various application programs 70 which are preferably stored on hard disk 32. Of particular interest to the present invention is a set of instructions embodied in a computer product and known as database management application program (DAMAP) 72. The effect of operation of database management application program (DAMAP) 72 is hereinafter described. A significant aspect of database management application program (DAMAP) 72 is maintenance and utilization of a log 80 which is maintained on disk 32.

Figure 2:
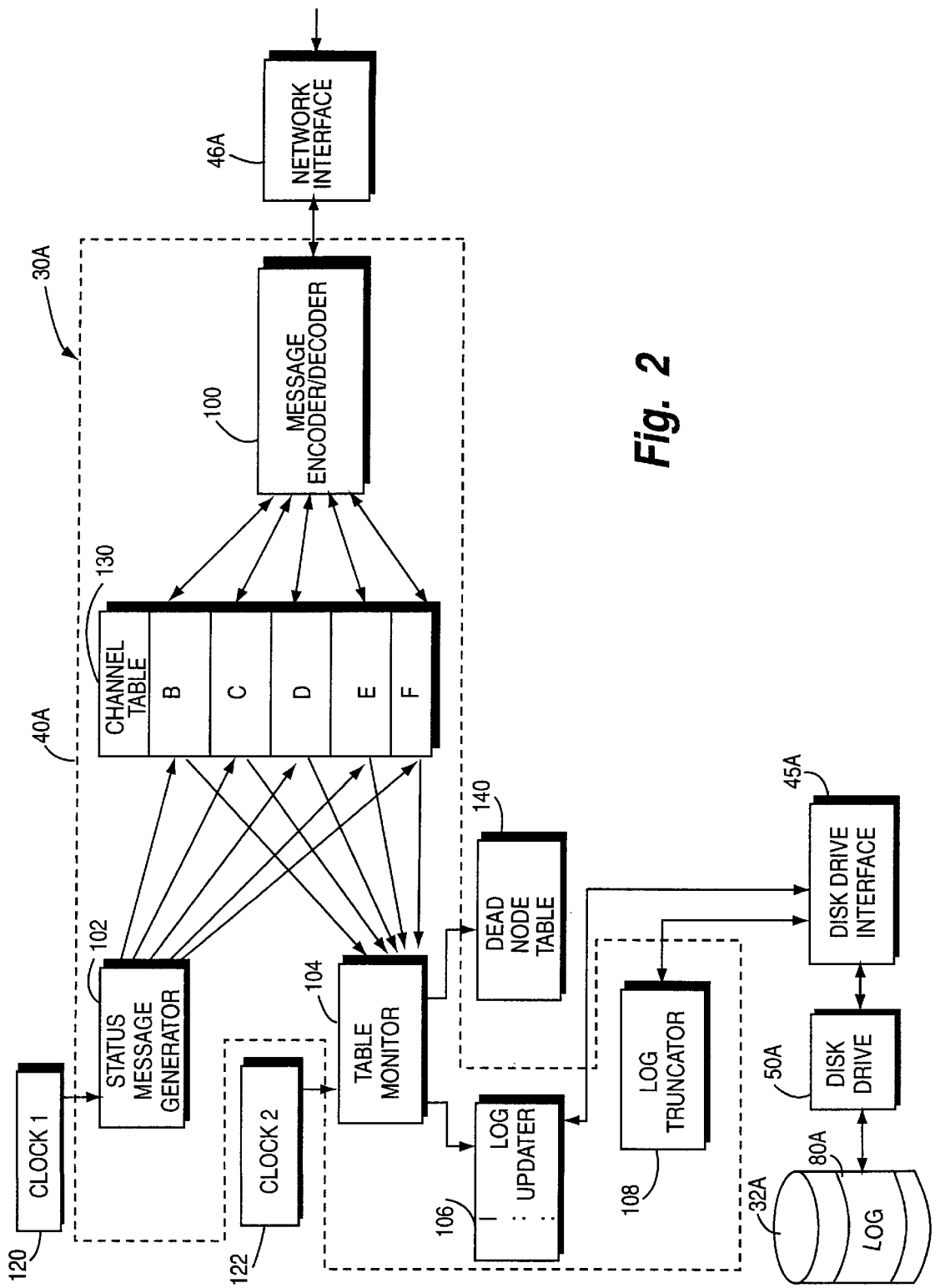
FIG. 2 is a schematic view of a node of the network of FIG. 1.

FIG. 2 shows node 30A in more detail and from a functional perspective. It will be understood that comparable structure and functionality also exists at other nodes of network 30, e.g., node 30B.

Processor 40A of node 30A, when executing the database management application program (DAMAP) 72A, performs the functions of a message encoder/decoder 100, a status message generator 102, channel table monitor 104, log updater 106, and log truncator 108. Message encoder/decoder 100 is connected to network interface 46 and serves to decode messages received from network link 60 and to encode messages destined for network link 60. Status message generator 102 receives first clock signals from a first clock 120; channel table monitor 104 receives second clock signals from a second clock 122.

Node 30A is in an "up" status after it has been successfully booted up, has had all its data objects initialized, and is in the course of executing normally. When in the up status, and upon receipt of each clock signal from first clock 120, status message generator issues a status interrogation message to each of the nodes of network 20. In response, those nodes of network 20 which have an "up" status (e.g., are not crashed or down) respond with an "Alive" message using conventional TCP/IP protocol. The "Alive" messages from the respective other nodes are decoded by message encoder/decoder 100 and an alive bit for the node is set in channel table 130.

Channel table 130 is used to store information regarding the nodes of the network, each node corresponding to a differing channel and hence to a differing channel slot in channel table 130. Although channel table 130 is shown as having as many as five potential slots for five nodes, in the present embodiment only one other node is shown for sake of simplification, i.e., node 30B ("B"). The information stored in each channel slot in channel table 130 includes a network address for the node. Thus, upon each clock signal received from clock 120, using the node addresses in channel table 130 the status message generator 102 prepares the status interrogation message which is encoded and applied via network interface 46A to network link 60. The information stored in each channel slot in channel table 130 also includes the returned status bit for the respective node. As mentioned above, this bit is set in accordance with receipt of the "Alive" message from the respective node.

Channel table 130 can be maintained in ROM 43. Alternatively, at least the returned status bits of channel table 130 can be stored in registers of processor 40.

With each clock signal issued by clock 122, channel table monitor 104 fetches the returned bit contents of channel table 130, reads the returned bit to ascertain that status of the node, and resets each of the bits in table 130. The frequency of the clock signal from clock 122 is considerably less than that of the clock signal from clock 120. If channel table monitor 104, upon receipt of a clock signal from clock 122, determines that the returned bit for a node has not changed from its reset to a set status, the corresponding node is declared as down. For example, if the channel slot B in channel table 130 has not been set in response to a status interration message from node 30B, node 30B is declared dead.

When a node is determined to be down, log updater 106 writes a nodestatus record (indicating that the node is down) to log 80A. The nodestatus record prepared by log updater 106 comprises an identification of the node and the status of the node. In one embodiment, a nodestatus record has the format "{B, nodestatus}", wherein "B" is an identifier of the node (i.e., node B [30B]) and "nodestatus" indicates that the status of the identified node. For example, if node 30B is declared down, a "nodedown" nodestatus record will be written to disk 32A as follows: {B, nodedown}.

When table monitor 104 declares a node to be dead, it further records an identification of the dead node in dead node table 140. Dead node table 140 is preferably stored in RAM 44. When dead node table 140 has a value stored therein indicative of a down node, table monitor 104 checks dead node table 140, upon receipt of the return bits from channel table 130, to determine whether any node listed in dead node table 140 has returned to up status. If the information gleaned from channel table 130 indicates that a node has changed from down status to up status, the corresponding node identifier is removed from dead node table 140 and a nodestatus record with a nodeup value is written to log 80A.

Periodically, log truncator 108 reads the contents of log 80A to determine whether records of log 80A can be removed with respect to any node. For example, if log 80A has the same number of nodedown and nodeup records for a given node, log truncator 108 can remove all the records for such node. Log truncator 108 thus serves economize storage for log 80A.

The foregoing has described normal operation of node 30A wherein node 30A is monitoring and, where appropriate, logging the status of other logs of network 20, particularly node 30B. Although not specifically described herein, it should be understood that other application programs executed by processor 40A of node 40A may be fetching, modifying the value, and restoring data object X-A, and also communicating the modification of the value to node 30B so that the updated (modified) value of data object X can be stored as X-B on disk 32B.

Figure 3:
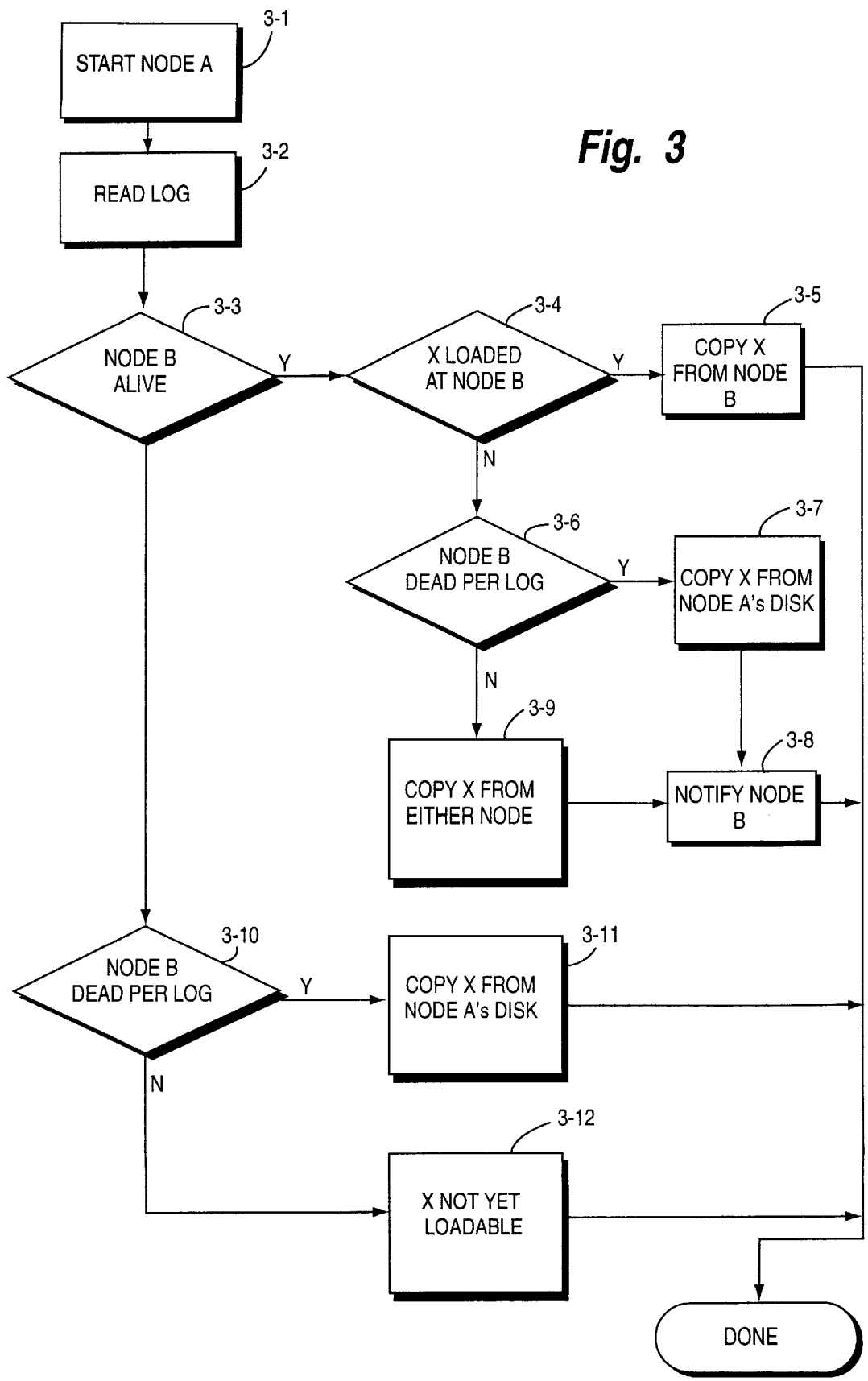
FIG. 3 is a flowchart showing steps executed in a data object initialization procedure of the present invention.

Now described is a situation in which node 30A crashes, e.g., goes to a down status, and then is subsequently restarted (e.g., returns to an up status). The difficulty faced by processor 40 in such situation is what value to utilize for data object X when data object X is next required by an application program, for example. Processor 40 must determine whether its version of data object X, i.e., X-A, is the most recent, or whether the value for data object X should be obtained from another node of network 20. The procedure performed in such a situation, known as the initialization procedure, is reflected by the steps shown in FIG. 3.

Step 3-1 reflects node 30A being restarted, e.g., reset or rebooted. After restart, processor 40A reads log 80A from disk 32A into RAM 44A (step 3-2). As indicated above, log 80A includes nodestatus records for nodes of network 20 which changed status (e.g., from down to up or from up to down) prior to the death of node 30A. Log 80A does not know what status changes may have occurred to other nodes of network 20 while node 30A was down.

At step 3-3 processor 40 determines whether node 30B is dead (down) or alive (up). This determination is performed by sending a message to node 30B, inquiring whether node 30B has data object X as active. By "active" is meant that a node's version of data object X has been loaded from node-status inviolable memory into memory such as RAM for current use. If node 30B does not answer, processor 40 concludes node 30B to be dead. Otherwise, node 30B answers either affirmatively (i.e., that data object X is active) or negatively (i.e., that data object X is not active). The answer to this inquiry is employed at step 3-4 to branch either to step 3-5 in the case of data object X being active at node 30B, or to step 3-6 in the case of data object X being inactive at node 30B.

If data object X is active at node 30B, processor 40A obtains the active version of object X from node 30B at step 3-5 in accordance with normal practice of obtaining copies of data objects at replicated databases.

If data object X is not active at node 30B, at step 3-6 processor 40 checks whether node B has a logged status of "down" in log 80A. Such can be the case, for example, in a scenario in which node B first died, node A further manipulated data object X, node A then died, and node B was restarted before node A was restarted. If node B has a logged status of "down" in log 80A, then processor obtains version X-A of the data object from its own disk 32A for use as the value of data object X (step 3-7). Processor 40 then notifies node 30B (step 3-8) of its initialized version of data object X, which is particularly beneficial in the situation that node B was restarted first but must wait upon restarting of node A in order to obtain the most recent value of the data object.

If it is determined at step 3-6 that node B does not have a logged status of "down" in log 80A, and yet node B is alive and waiting for data object X, processor 40A concludes that deaths of nodes A and B occurred essentially simultaneously. Such being the case, at step 3-9 processor 40A obtains a copy of data object from whichever of the two nodes A, B, it prefers. In most situations, it will be easier to obtain its copy of the data object from version X-A stored on its own disk, as in the manner above described for step 3-7. Then processor 40A notifies node 30B (step 3-8).

If it is determined at step 3-3 that node B is not alive (e.g, node B is down), processor 40A checks at step 3-10 whether node B is indicated as being down in log 80A. If node B has a "down" logged status, at step 3-11 processor 40A obtains version X-A from its disk 32A for use as the initialized value of the data object, in the same manner as step 3-7. Since node B is down, there is no need to communicate the initialized value of the data object to node B. If, on the other hand, node B is not indicated in log 80A as being down, processor 40A must indicate that data object X is not yet loadable (step 3-12). Such occurs in a scenario in which node A was the first to die, node B thereafter may have changed the value of the data object, node B then died (e.g., was second to die), node A was first restarted, and then (subsequently) node B was restarted. In such case, node A would have to wait for a message from node B which would be analogous to the message generated at step 3-8 by node A.

Although for simplicity the invention has been described above in terms of a network 20 including two nodes, i.e., nodes 30A and 30B, the invention is readily applicable to networks have a greater number of nodes. In this regard, provided below is generalized logic for initializing data object X according to the invention at node 30A in networks of any size. As used herein, the term "REPS" refers to a set of nodes (other than node 30A) at which a replica of data object X exists. "ACTIVE" is a set of all nodes currently running, i.e., are alive. "AREPS" is the set of nodes which are currently running and also have replicas of data object X. "DOWNS" is the set of nodes that died before node 30A died, according to log 80A of node 30A. "D2" is the intersection of sets DOWNS and REPS.

The ACTIVE information is obtained before initialization by checking the status of all nodes using network I/O in the manner described in connection with channel table 130 above. The procedure described above works even when the ACTIVE set is empty.

If data object X has already been loaded into a node included in the set AREPS, then processor 40A need only obtain a copy of data object X from such node over the network.

If, however, the set D2 is the same as the set REPS, processor 40A notes that its log 80A has nodedown records as the last records for all other nodes which held replicas of data object X. In this case, processor 40A of node 30A realizes that it was the last to manipulate data object X, and can load the value for data object X from its version X-A stored on disk 32A. Processor 40A also informs all other nodes in the set of AREPS over the network of the initialized value of data object X.

If the set REPS is the same as the set AREPS, processor 40 assumes that nodes failed simultaneously. Neither of the nodes will be able to find the necessary nodedown message in their respective logs. Such can occur when (a) the data object is not available on the network, or (b) all other nodes which are supposed to have a replica of the data object are running, but none of those nodes have the data object loaded. In such situation processor 40A can conclude that simultaneous failures occurred, and can chose either node to load data object X from disk. The chosen one of the nodes must, however, notify the remaining nodes that they can now copy the data object over the network.

In the situation that the set REPS is not the same as the set AREPS, processor 40A cannot yet load data object X, but must instead wait until any other of the nodes decide to read data object X from their respective disks. Processor 40A for the present merely indicates that data object X is not yet loaded, and continues.

The present invention has both simplicity and applicability. The present invention can be implemented for data-management systems that do not employ a concurrency control algorithm, and is applicable for database systems that maintain multiple replicas of datasets. The present invention is applicable, for example, to a fault tolerant world wide web (WWW) server which replicates its data. Whenever a data object is written in the WWW server, it is written at two nodes. For this type of application, it is vital that all replicas be able to start without requiring that the other node be running.

Moreover, for situations in which two nodes replicating a data object, upon failure of one node the other node can continue to update its (by now single) replica. Updating can continue safely since the present invention ensures that even if this last node were to fail, the correct version of the data object would be loaded regardless.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A node of a network which comprises:
    a memory, inviolable with respect to a status of the node, wherein are stored:
        a value for a data object;
        a log reflecting a logged second node status of a second node of the network, the data object being replicated at the second node;
    a processor which maintains the log and which, when the status of the node changes from a down status to an up status, uses the logged second node status to determine how to initialize the data object.

2. The apparatus of claim 1, wherein the second node status is the down status and the logged second node status is the down status, the processor initializes the data object with the value maintained in the memory.

3. The apparatus of claim 1, wherein the second node status is the down status and the logged second node status is the up status, the processor is unable to initialize the data object.

4. The apparatus of claim 1, wherein the second node status is the up status and the logged second node status is the down status, the processor initializes the data object with the value maintained in the memory.

5. The apparatus of claim 1, wherein the second node status is the up status and the logged second node status is the up status, the processor obtains an initialization value for the data object from the second node.

6. A network having at least two nodes, the network comprising a first node and a second node,
    the first node having:
        a first node memory, inviolable with respect to a status of the node, wherein are maintained on an on-going basis:
            a first node value for a replicated data object;
            a first node log reflecting a second node logged status of the second node of the network;
        a first node processor which maintains the first node log and which, when the status of the first node changes from a down status to an up status, uses the logged second node status to determine how to initialize the first node value of the data object;
    the second node having:
        a second node memory, inviolable with respect to a status of the node, wherein are maintained on an on-going basis:
            a second node value for the replicated data object;
            a second node log reflecting a first node logged status of the first node of the network;
        a second node processor which maintains the second node log and which, when the status of the second node changes from a down status to an up status, uses the logged first node status to determine how to initialize the second node value of the data object.

7. A computer product comprising a set of programmed instructions stored in a program memory, the set of instructions upon being executed by a processor of a first node of a network performing the steps of:
    ascertaining a second node status of a second node of the network and, while the first node has an up status, maintaining on an on-going basis a logged second node status in a memory of the first node which is inviolable with respect to the status of the first node;
    when the status of the first node changes from a down status to the up status, using the logged second node status to determine how to initialize a data object, the data object also being maintained on an on-going basis in the inviolable memory of the first node.

8. The computer product of claim 7, wherein execution of the set of programmed instructions results in performance of the following further step:
    initializing the data object with a value maintained on an on-going basis in the inviolable memory when the second node status is the down status and the logged second node status is the down status.

9. The computer product of claim 7, wherein execution of the set of programmed instructions results in performance of the following further step:
    failing to initialize the data object when the second node status is the down status and the logged second node status is the up status.

10. The computer product of claim 7, wherein execution of the set of programmed instructions results in performance of the following further step:
    initializing the data object with a value maintained on an on-going basis in the inviolable memory when the second node status is the up status and the logged second node status is the down status.

11. The computer product of claim 7, wherein execution of the set of programmed instructions results in performance of the following further step:
    obtaining an initialization value for the data object from the second node when the second node status is the up status and the logged second node status is the up status.

12. A method of maintaining a data object in a replicated database system,
    maintaining on an on-going basis coordinated values of the data object in node-status inviolable memories of a first node and a second node;
    periodically generating messages at the first node and the second node respectively indicative of an up status of the first node and the second node and transmitting the messages between the first node and the second node;

maintaining on an on-going basis logs in the inviolable memories of each of the first node and a second node, a node log of the first node having stored therein a logged second node status, a node log of the second node having stored therein a logged first node status;

when one of the first node and the second node acquires a down status and thereafter changes from the down status to an up status, using the node log thereof to determine how to initialize the data object.

* * * * *